(12) United States Patent
Lin et al.

(10) Patent No.: US 11,009,748 B2
(45) Date of Patent: May 18, 2021

(54) DISPLAY DEVICE

(71) Applicant: InnoLux Corporation, Miao-Li County (TW)

(72) Inventors: Nan-Chun Lin, Miao-Li County (TW); Jia-Ming Li, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 37 days.

(21) Appl. No.: 16/506,688

(22) Filed: Jul. 9, 2019

(65) Prior Publication Data

US 2020/0026127 A1 Jan. 23, 2020

(30) Foreign Application Priority Data

Jul. 18, 2018 (CN) .......................... 201810788539.6

(51) Int. Cl.
*G02F 1/13357* (2006.01)
*G02F 1/1333* (2006.01)
*G02F 1/1335* (2006.01)

(52) U.S. Cl.
CPC .. *G02F 1/133606* (2013.01); *G02F 1/133308* (2013.01); *G02F 1/133608* (2013.01); *G02F 1/133311* (2021.01); *G02F 1/133607* (2021.01); *G02F 2201/46* (2013.01)

(58) Field of Classification Search
None
See application file for complete search history.

(56) References Cited

U.S. PATENT DOCUMENTS

| | | | |
|---|---|---|---|
| 2002/0080298 A1* | 6/2002 | Fukayama | G02F 1/13452 349/58 |
| 2010/0315803 A1* | 12/2010 | Inoue | G02B 5/0278 362/97.1 |
| 2019/0121019 A1* | 4/2019 | Chen | G02B 6/0088 |

FOREIGN PATENT DOCUMENTS

| | | |
|---|---|---|
| TW | 201100914 A | 1/2011 |
| TW | 201413327 A | 4/2014 |

* cited by examiner

*Primary Examiner* — Phu Vu
(74) *Attorney, Agent, or Firm* — Muncy, Geissler, Olds & Lowe, P.C.

(57) ABSTRACT

A display device includes a display panel and an optical element. The display panel includes a non-display area and a display area. The optical element is disposed corresponding to the display panel and includes a main body portion and a positioning portion connected to the main body portion. The main body portion includes a first part corresponding to the non-display area and a second part corresponding to the display area. The first part has a first opening disposed adjacent to the positioning portion.

17 Claims, 9 Drawing Sheets

DISPLAY DEVICE

CROSS REFERENCE TO RELATED APPLICATIONS

This Non-provisional application claims priority under 35 U.S.C. § 119(a) on Patent Application No(s). 201810788539.6 filed in People's Republic of China on Jul. 18, 2018, the entire contents of which are hereby incorporated by reference.

BACKGROUND

Technical Field

This disclosure relates to a display device and, in particular, to a display device that can reduce the mura phenomenon.

Related Art

In a display device, the optical elements, such as diffusers, brightness enhancement films, and the likes, are usually disposed on the back plate and located corresponding to the display panel. However, in practice, the external liquid (e.g. water or oil) or dusts may penetrate into the optical elements through the back plate or other frame components. In some serious cases, the external liquid or dusts may penetrate into a part of the optical elements corresponding to the display area of the display panel, thereby causing abnormal display images (e.g. the mura phenomenon). Therefore, it is desired to provide some approaches to reduce the abnormal display images caused by penetrating the liquid or dusts into the optical element corresponding to the display area, thereby improving the quality of the display device.

SUMMARY

A display device comprises a display panel and an optical element. The display panel comprises a non-display area and a display area. The optical element is disposed corresponding to the display panel and comprises a main body portion and a positioning portion connected to the main body portion. The main body portion comprises a first part corresponding to the non-display area and a second part corresponding to the display area. The first part has a first opening disposed adjacent to the positioning portion.

BRIEF DESCRIPTION OF THE DRAWINGS

The embodiments will become more fully understood from the detailed description and accompanying drawings, which are given for illustration only, and thus are not limitative of the present disclosure, and wherein.

DETAILED DESCRIPTION OF THE DISCLOSURE

The display devices according to some embodiments of this disclosure will be described hereinafter. To be noted, the following examples show different aspects of some embodiments of this disclosure. The specific elements and arrangements described below are merely illustrative of some embodiments of the present disclosure. Of course, these are used as examples and not as a limitation of the present disclosure. Moreover, repeated reference numbers or labels may be used in different embodiments. These repeated reference numbers or labels are merely illustrative of some embodiments of the present disclosure and are not intended to represent any relationships of the various discussed embodiments and/or structures. Furthermore, when describing that a first material layer is disposed on or above a second material layer, the first material layer can be in direct contact with the second material layer. Alternatively, this description is also possible to be realized as having one or more material layers interposed between the first and second material layers, in which case the first material layer and the second material layer are not in direct contact with each other.

With regard to "about" or "approximately" as used in this disclosure, the error or range of the value is generally within 20 percent, preferably within 10 percent, and more preferably within 5 percent, 3 percent, 2 percent, 1 percent, or 0.5 percent. In the absence of a clear statement in the disclosure, the values mentioned are all considered to be approximate values. That is, the values mentioned have an error or range represented by "about" or "approximately".

Figure 1:
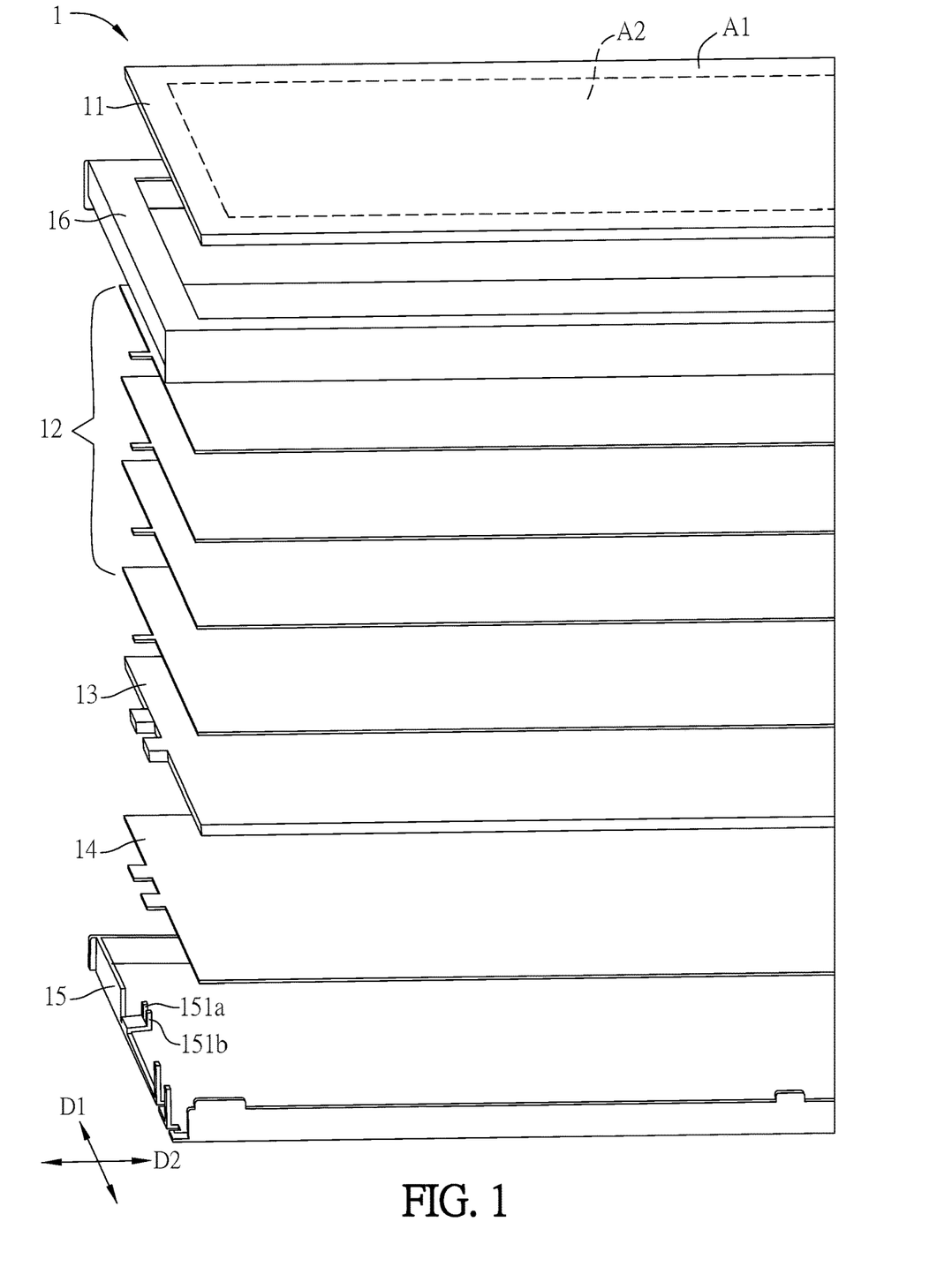
FIG. 1 is a partial exploded view of a display device according to an embodiment of this disclosure.

FIG. 1 is a partial exploded view of a display device according to an embodiment of this disclosure.

As shown in FIG. 1, the display device 1 comprises a display panel 11 and a backlight module (not shown). In this embodiment, the display panel 11 is disposed on, for example, a frame member 16 (e.g. the front frame) and located corresponding to the backlight module. The material of the frame member 16 can comprise, for example, plastics, metal, ceramic, any of other suitable materials, or their combinations. This disclosure is not limited thereto. The frame member 16 is configured to support the display panel 11. In addition, an adhesive member or a tape (not shown) can be disposed between the frame member 16 and the display panel 11 for attaching the display panel 11 on the frame member 16. This disclosure is not limited thereto.

The display panel 11 has a non-display area A1 and a display area A2. The non-display area A1 is, for example, disposed adjacent to the display area A2. The display panel 11 has pixels (not shown) disposed corresponding to the display area A2. The display panel 11 also has circuit components (not shown) or traces (not shown) disposed corresponding to the non-display area A1. For example, the circuit components can comprise driving circuits (shift registers) or the likes, but this disclosure is not limited thereto. In some embodiments, the display area A2 is disposed at the center region of the display panel 11, and the non-display area A1 is disposed around the display area A2. In other embodiments, the non-display area A1 is disposed adjacent to at least one part of the display area A2. The display device 1 can be, for example but not limited to, a LCD device, an OLED (organic light-emitting diode) display device, a QD (quantum dot) display device, an LED (light-emitting diode) display device, a micro LED (micro light-emitting diode) display device, a mini LED (mini light-emitting diode) display device, or any of other display devices. This disclosure is not limited thereto.

As shown in FIG. 1, the backlight module comprises at least one optical element 12, a light-guiding plate 13, a light-emitting assembly (not shown), and a reflective member 14. The light emitting assembly can be an edge-type light-emitting assembly or a direct-type light-emitting assembly, but this disclosure is not limited thereto. The light-emitting assembly can comprise cathode fluorescent lamps (CCFL), light-emitting diodes (LED), or any of other suitable light-emitting assemblies, but this disclosure is not limited thereto. For example, the light-emitting diodes of the light-emitting assembly can comprise organic light-emitting diodes (OLED), quantum dot (QD), fluorescence material, phosphor material, light-emitting diodes (LED), micro light-emitting diodes (micro LED), mini light-emitting diodes (mini LED), or the likes, but this disclosure is not limited thereto. In some embodiments, the LED chip size is from about 300 μm to 10 mm, the mini LED chip size is from about 100 μm to 300 μm, and the micro LED chip size is from about 1 μm to 100 μm. This disclosure is not limited thereto. The light-guiding plate 13 comprises, for example, a transparent material, such as acrylic resin, polycarbonate, polyethylene resin, glass, or any of other suitable materials, but this disclosure is not limited thereto. To be noted, the components of the display device 1, the arrangement of the components, or the amount of the components as shown in FIG. 1 are for illustrations and not to limit the scope of this disclosure. In some embodiments, some of the components can be optionally removed or added. For example, in the direct-type light-emitting assembly, the light-guiding plate 13 can be removed, but this disclosure is not limited thereto.

The display device 1 further comprises a back plate 15, which is, for example, configured to accommodate or support the relative components of the backlight module. The material of the back plate 15 has, for example, a heat-dissipation function or a supporting function, but this disclosure is not limited thereto. The material of the back plate 15 can comprise, for example, metal (including stainless steel, aluminum alloy, or other metals or alloys), plastics, ceramics, any of other suitable materials, or their combinations, but this disclosure is not limited thereto. The back plate 15 can be formed by injection molding, insert molding, punching molding, or any of other suitable manufacturing methods, but this disclosure is not limited thereto. As shown in FIG. 1, the reflective member 14 can be disposed, for example, between the back plate 15 and the light-guiding plate 13. For example, the reflective member 14 can reflect the light outputted from the bottom surface of the light-guiding plate 13 back the light-guiding plate 13, thereby increasing the light utility. The reflective member 14 can be a reflective plate, a reflective sheet, a reflective film, or a coated layer with the reflective function, but this disclosure is not limited thereto. The reflective member 14 contains the reflective material, which comprises, for example but not limited to, metal, metal oxide, high-reflective paint (white paint), or their combinations, but this disclosure is not limited thereto.

As shown in FIG. 1, at least one optical element 12 is disposed between the light-guiding plate 13 and the display panel 11, and the optical element 12 is disposed corresponding to the display panel 11. The optical element 12 can be, for example, an optical film disposed above the back plate 15. The optical element 12 comprises, for example, a brightness enhancement film (BEF), a dual brightness enhancement film (DBEF), a microstructure sheet, a color conversion sheet (e.g. quantum dot film, fluorescent film, or the likes), or a diffusor sheet (comprising, for example, polymer dispersed liquid crystal (PDLC) or polymer network liquid crystal (PNLC)), but this disclosure is not limited thereto. The brightness enhancement film can comprise a protruding structure (V-cut structure) extending along the horizontal direction, a protruding structure extending along the vertical direction, or a protruding structure extending along any suitable direction. To be noted, the optical element 12 of FIG. 1 can be selected from various optical film arrangements based on the application or optical requirement of the display device 1. As shown in FIG. 1, the display device 1 comprises four optical elements 12, and the types, amount, or positions of the optical elements are not limited in this disclosure.

Figure 2A:
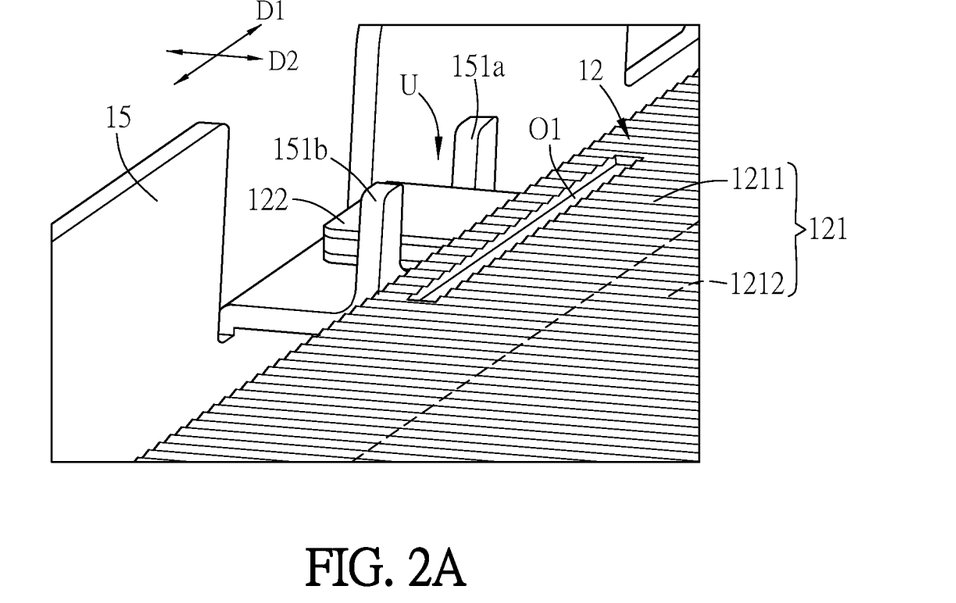
FIG. 2A is a schematic diagram showing the connection part of the back plate and the optical element according to an embodiment of this disclosure.

FIG. 2A is a schematic diagram showing the connection part of the back plate and the optical element according to an embodiment of this disclosure. As shown in FIG. 2A, for example, the optical element 12 comprises a main body portion 121 and a positioning portion 122, which are connected with each other. The positioning portion 122 is configured to fix or position the optical element 12 and the back plate 15, thereby decreasing the possible displacement of the optical element 12. In some embodiments, the optical element 12 comprises a plurality of positioning portions 122, which can be disposed at, for example, at least one side of the optical element 12. In some embodiments, the shapes or sizes of the positioning portions 122 of the optical element 12 can be the same or different. The positioning portions 122 can be defined as the protrusions (protruding outwardly) of the main body portion 121 of the optical element 12. In some embodiments, the materials of the positioning portion 122 and the main body portion 121 can be different. In some embodiments, one side of the optical element 12 can comprise at least one positioning portion 122. In some embodiments, two sides (e.g. the left side and the right side (two opposite sides)) or four sides of the optical element 12 can individually comprise at least one positioning portion 122. In some embodiments, the sizes, shapes or relative locations (e.g. at the middle or end of the side) of the position portions 122 disposed at different sides can be the same or different. In some embodiments, the positioning portions 122 disposed at the opposite sides may have similar sizes or shapes, and are symmetrically arranged. In some embodiments, the positioning portions 122 disposed at the opposite sides may have different sizes, shapes, or relative positions, and are asymmetrically arranged.

For example, the main body portion 121 comprises a first part 1211 and a second part 1212. The first part 1211 is disposed corresponding to the non-display area A1 of the display panel 11, and the second part 1212 is disposed corresponding to the display area A2 of the display panel 11. Accordingly, the light emitted from the light-emitting assembly can pass through the second part 1212 of main body portion 121 of the optical element 12, and then be outputted from the display area A2 of the display panel 11.

For example, as shown in FIG. 2A, one side of the back plate 15 is depressed inwardly and is configured with two protruding portions (a protruding portion 151a and a protruding portion 151b). This disclosure is not limited thereto. In this embodiment, a slot U is formed between the protruding portion 151a and the protruding portion 151b. For example, the positioning portion 122 can be configured without the opening or accommodating hole, and the positioning portion 122 can be disposed in the slot U between the protruding portion 151a and the protruding portion 151b for disposing the optical element 12 on the back plate 15. The positioning portion 122 can be used to fix or position the optical element 12 on the back plate 15. As shown in FIG. 2A, the first part 1211 has a first opening O1 disposed adjacent to the positioning portion 122 as well as the protruding portion 151a and the protruding portion 151b.

Figure 2B:
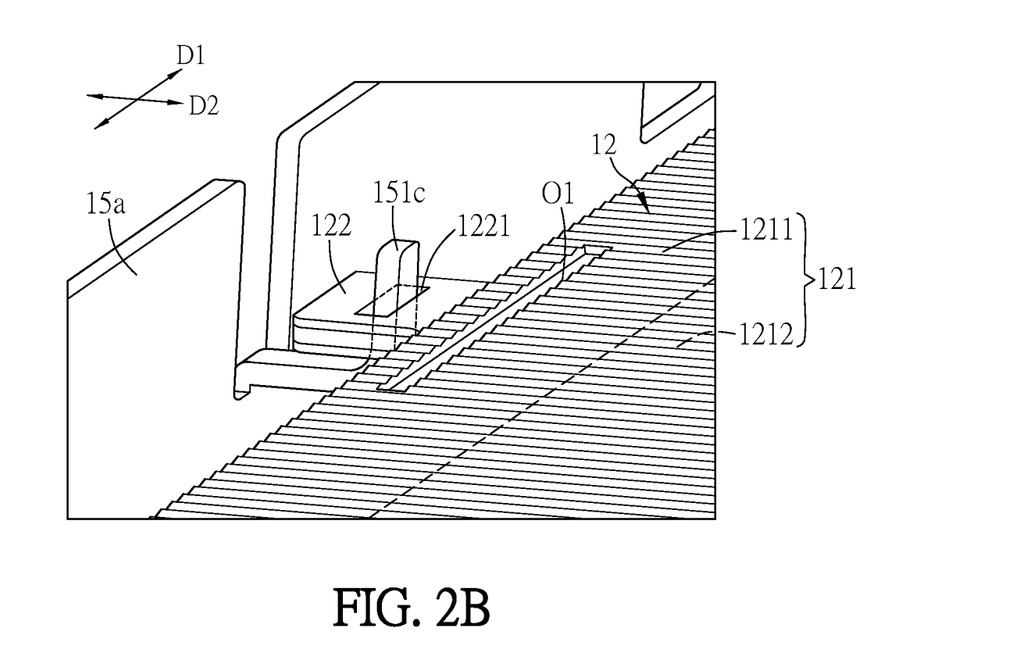
FIG. 2B is a schematic diagram showing the connection part of the back plate and the optical element according to another embodiment of this disclosure.

FIG. 2B is a schematic diagram showing the connection part of the back plate 15a and the optical element 12 according to another embodiment of this disclosure. As shown in FIG. 2B, one side of the back plate 15a is depressed inwardly and is configured with one protruding portion 151c. The positioning portion 122 has an accommodating hole 1221 disposed corresponding to the protruding portion 151c. The protruding portion 151c can be disposed in the accommodating hole 1221 for fixing or positioning the optical element 12 on the back plate 15a. In some embodiments, the protruding portion 151c can pass through the accommodating hole 1221 for hanging the optical element 12 on the back plate 15a. The shape of the accommodating hole 1221 can be, for example, a polygonal shape (such as a quadrangle, a triangle, a trapezoid, or the likes), an arc shape, or any of other shapes, and the disclosure is not limited thereto.

In some embodiments, the first direction D1 is defined as the extension direction of the first opening O1. In the embodiments, the length of the first opening O1 in the first direction D11 is different from the length of the positioning portion 122 or the accommodating hole 1221 extending in the first direction D1. In some embodiments, the length of the first opening O1 in the first direction D1 is greater than the length of the positioning portion 122 or the accommodating hole 1221 in the first direction D1.

In addition, a second direction D2 is perpendicular to the first direction D1. As shown in FIG. 2A or 2B, the optical element 12 of this embodiment can be, for example but not limited to, a brightness enhancement film. For example, the brightness enhancement film has a protruding structure extending along the second direction D2, and two adjacent protruding structures can form a groove therebetween. In the embodiment as shown in FIG. 2A, the groove extends along the second direction D2, but this disclosure is not limited thereto. In other embodiments, the groove, for example, extends along a direction other than the second direction D2. To be noted, FIG. 2A or 2B does not show the protruding structure of the positioning portion 122, but this disclosure is not limited thereto. In other embodiments, the positioning portion 122 can be, for example, configured with the protruding structure, and the protruding structure of the positioning portion 122 extends to the protruding structure of the main body portion 121.

The shape of the protruding portion 151a, the protruding portion 151b or the protruding portion 151c as mentioned above can be, for example, a column shape, a hook shape, a mushroom shape, or any shape that is suitable for positioning the optical element 12 on the back plate 15. This disclosure is not limited thereto. In some embodiments, the side, the protruding portion 151a, the protruding portion 151b, or the protruding portion 151c of the back plate 15 can comprise a metal material, but this disclosure is not limited thereto. When the material of the protruding portion 151a, the protruding portion 151b, or the protruding portion 151c comprises a metal material, it may have a higher hardness for avoiding the break caused by the external force or other components. In some embodiments, the material of the protruding portion 151a, the protruding portion 151b, or the protruding portion 151c comprises a metal material, but the other parts of the back plate comprise a plastic material. When the other parts of the back plate comprise a plastic material, the weight of the entire display device can be decrease, the manufacturing cost can be lowered, or the back plate can be formed with a special shape. In some embodiments, in order to reduce the deformation of the optical element 12 caused by heat or moisture, one side of the back plate can be configured with a protruding portion 151a and a protruding portion 151b for forming a slot U, and the other side of the back plate can be configured with a protruding portion 151c for providing a reserved space for the optical element 12. This configuration can reduce the deformation of the optical element 12, but this disclosure is not limited thereto. In some embodiments, two sides of the back plate can be individually configured with one protruding portion 151c.

Figure 3A:
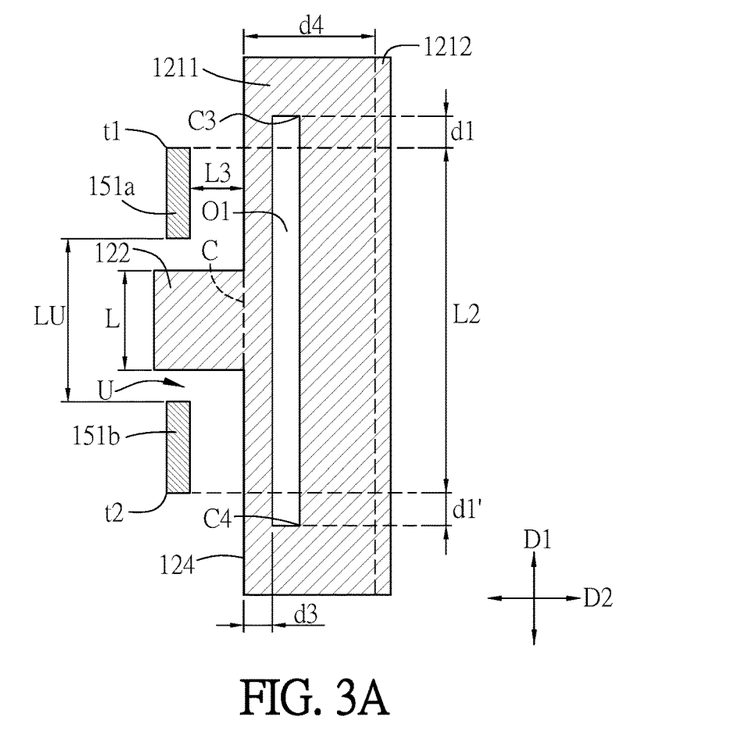
FIG. 3A is a partial top view of the protruding portion and the optical element of FIG. 2A.
Figure 3B:
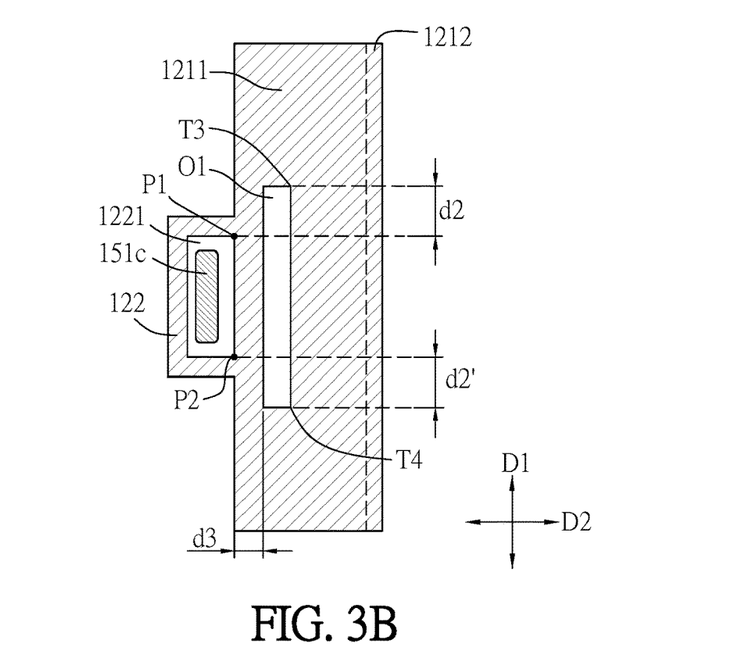
FIG. 3B is a partial top view of the protruding portion and the optical element of FIG. 2B.

FIG. 3A is a partial top view of the protruding portion 151a, the protruding portion 151b and the optical element 12 of FIG. 2A, and FIG. 3B is a partial top view of the protruding portion 151c and the optical element 12 of FIG. 2B.

As shown in FIGS. 2A, 2B, 3A and 3B, a first part 1211 of the optical element 12 is configured with a first opening O1, which can be disposed adjacent to the positioning portion 122. In some embodiments, the first opening O1 can be disposed adjacent to and corresponding to the positioning portion 122. In more detailed, a connection edge C is disposed between the positioning portion 122 and the first part 1211, and the connection edge C and the first opening O1 are overlapped in the second direction D2. In this embodiment, the first opening O1 can extend along a side of the optical element 12. That is, the extension direction of the side of the optical element 12 is roughly equal to the first direction D1, but this disclosure is not limited thereto. In some embodiments, the extension direction (the first direction D1) of the opening O1 can be different from the extension direction of the side of the optical element 12. In some embodiments, the first opening O1 can be, for example, composed of openings with different extension directions. For example, the first opening O1 can be an L-shaped or U-shaped opening, but this disclosure is not limited thereto.

In addition, a shape of the first opening O1 in a normal direction of the main body portion 121 of the optical element 12 (or a top-view direction of the touch panel 11) comprises a polygonal shape (including a quadrangle), an arc shape, a wavy shape, any suitable shape, or their combinations. This disclosure is not limited thereto.

In some embodiments, a length of the first opening O1 in the first direction D1 is different from a length of the positioning portion 122 or the accommodating hole 1221 in the first direction D1. In some embodiments, a length of the first opening O1 in the first direction D1 is greater than a length of the positioning portion 122 or the accommodating hole 1221 in the first direction D1. In some embodiments, a length of the first opening O1 in the first direction D1 is less than or equal to a length of the positioning portion 122 or the accommodating hole 1221 in the first direction D1. As shown in FIG. 3A, the length of the first opening O1 in the first direction D1 is greater than the length of the positioning portion 122 in the first direction D1. In addition, as shown in FIG. 3B, the length of the first opening O1 in the first direction D1 is greater than the length of the positioning portion 122 and the accommodating hole 1221 in the first direction D1, and the width of the first opening O1 in a second direction D2 (e.g. the second direction D2 is perpendicular to the first direction D1) is less than the width of the positioning portion 122 or the accommodating hole 1221 in the second direction D2. The above-mentioned length can be defined as the maximum length in the first direction D1, and the above-mentioned width can be defined as the maximum width in the second direction D2.

Referring to FIG. 3A, the positioning portion 122 is disposed corresponding to the slot U, which is defined by the protruding portion 151a and the protruding portion 151b, and the length L of the first opening O1 in the first direction D1 is less than the length LU of the slot U in the first direction D1. The length LU is the minimum distance between the protruding portion 151a and the protruding portion 151b in the first direction D1. In this embodiment, the first opening O1 is, for example, disposed adjacent to the positioning portion 122, the protruding portion 151a and the protruding portion 151b. The protruding portion 151a has an end point t1, which is one point on the protruding portion 151a farthest from the positioning portion 122 in the first direction D1. The protruding portion 151b has an end point t2, which is one point on the protruding portion 151b farthest from the positioning portion 122 in the first direction D1. The opening O1 has two end points (e.g. an end point C3 and an end point C4) in the first direction D1. The end point C3, which is one point on the first opening O1 farthest from the positioning portion 122 in the first direction D1, is located adjacent to the end point t1. The end point C4, which is another point on the first opening O1 farthest from the positioning portion 122 in the first direction D1, is located adjacent to the end point t2. The end point C3 and the end point C4 are disposed at two opposite ends of the first opening O1. In some embodiments, a distance d1 between the end point t1 and the end point C3 in the first direction D1 is greater than or equal to ((L/2)+5) mm. In some embodiments, a distance d1' between the end point t2 and the end point C4 in the first direction D1 is greater than or equal to ((L/2)+5) mm.

In some embodiments, the sizes or shapes of the protruding portion 151a and the protruding portion 151b can be the same or different. This disclosure is not limited. In some embodiments, the distance d1 and the distance d1' can be the same or different. This disclosure is not limited. In some embodiments, as shown in FIG. 3A, a minimum distance between the protruding portion 151a and the first part 1211 of the main body portion 121 in the second direction D2 is defined as a distance L3. For example, the distance L3 ranges from 1 mm to 5 mm (1 mm≤L3≤5 mm), but this disclosure is not limited thereto. In some embodiments, the distance L3 ranges from 1 mm to 3 mm (1 mm≤L3≤3 mm).

In addition, a connection edge C is defined between the positioning portion 122 and the first part 1211, and the distance d3 can be defined as the minimum distance between the connection edge C and the first opening O1 in the second direction D2. In some embodiments, the distance d3, which is the minimum distance between the connection edge C and the first opening O1 in the second direction D2, ranges from 0.5 mm to 10 mm (0.5 mm≤d3≤10 mm), but this disclosure is not limited thereto. In some embodiments, the distance d3 ranges from 0.5 mm to 5 mm (0.5 mm≤d3≤5 mm). In some embodiments, the distance d3 ranges from 0.5 mm to 5 mm (0.5 mm≤d3≤3 mm). In some embodiments, the length of the connection edge C in the first direction D1 can be, for example, less than the length of the first opening O1 in the first direction D1.

In some embodiments, a distance d4 is defined between the side 124 and the second part 1212 of the optical element 12. In some embodiments, the distance d4 is, for example, 15 mm, but this disclosure is not limited thereto. In some embodiments, the distance d4 can be, for example, 10 mm. In some embodiments, the distance d4 can be, for example, 5 mm. To be noted, in the aspects of FIGS. 3A and 3B, the length of the first opening O1 in the first direction D1 is greater than the distance between the end point t1 and the end point t2 in the first direction D1.

In the aspect of FIG. 3B, the side of the accommodating hole 1221 located closest to the main body portion 121 has an end point P1 and an end point P2, and the first opening O1 has two end points (e.g. an end point T3 and an end point T4) in the second direction D2. As defined above, the end point T3 is disposed adjacent to the end point P1, and the end point T4 is disposed adjacent to the end point P2. In some embodiments, a distance d2 is defined between the end point P1 and the end point T3 in the first direction D1. In some embodiments, the distance d2 is, for example, greater than or equal to 5 mm. In some embodiments, a distance d2' is defined between the end point P2 and the end point T4 in the first direction D1. In some embodiments, a distance d2' is defined between the end point P2 and the end point T4 in the first direction D1, and the distance d2' is, for example, greater than or equal to 5 mm. The distance d2 or the distance d2' can be designed to be greater than or equal to 5 mm to block the penetrating path of the liquid or dusts entering the optical element 12, or to decrease the amount of the liquid or dusts penetrating into the second part 1212 of the optical element 12.

For example, as shown in FIG. 2B, when the optical element 12 is a brightness enhancement film, the first part 1211 is configured with a first opening O1, so that the liquid or dusts cannot easily penetrate from the positioning portion 122 to the second part 1212 of the optical element 12 along the protruding structure (e.g. V-cut structure) of the optical element 12, thereby reducing the mura phenomenon of the displayed image.

FIGS. 4A to 4D and FIGS. 5A to 5D are schematic diagrams showing different aspects of the optical element of this disclosure.

Figure 4A:
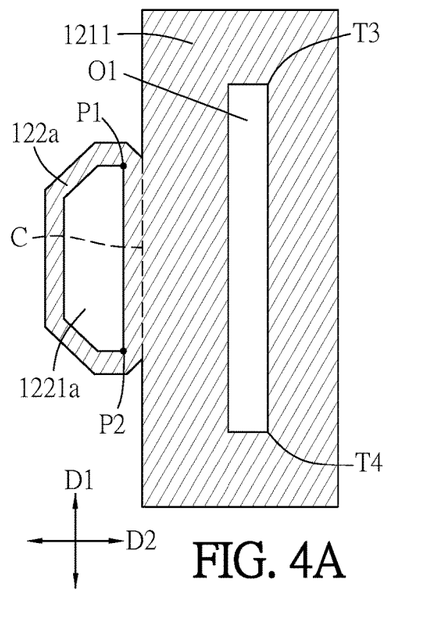
FIGS. 4A to 4D and FIGS. 5A to 5D are schematic diagrams showing different aspects of the optical element of this disclosure.

As shown in FIG. 4A, the shape of the positioning portion 122a of this embodiment is, for example, a polygonal shape. The accommodating hole 1221a is, for example, a hexagonal shape.

Figure 4B:
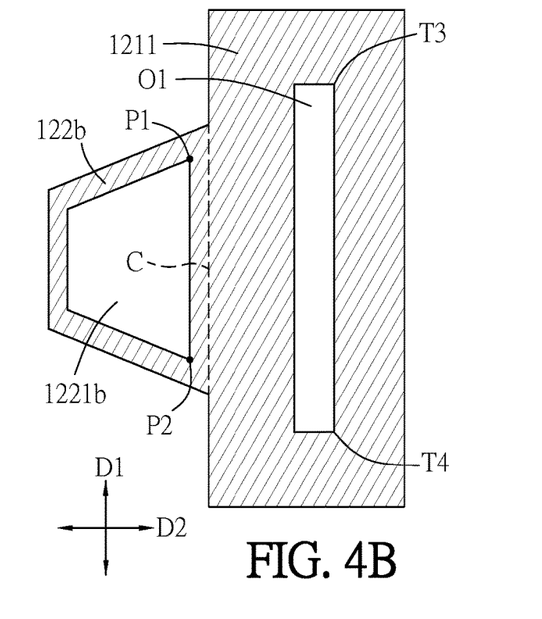

As shown in FIG. 4B, the shapes of the positioning portion 122b and the accommodating hole 1221b are, for example, both trapezoid.

Figure 4C:
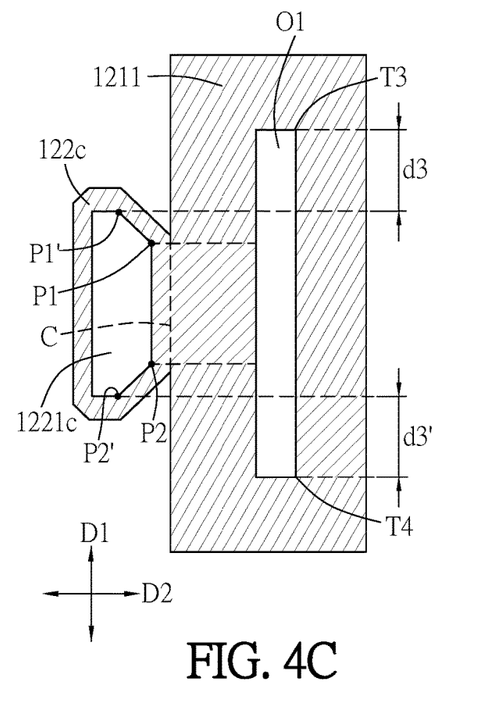

As shown in FIG. 4C, the shape of the positioning portion 122c of this embodiment is, for example, a polygonal shape. The accommodating hole 1221c thereof is, for example, a hexagonal shape. Different from the embodiment of FIG. 4A, as shown in FIG. 4C, the length of the connection portion of the positioning portion 122c and the first part 1211 in the first direction D1 is less than the length of the side of the positioning portion 122c away from the first part 1211 in the first direction D1.

Figure 4D:
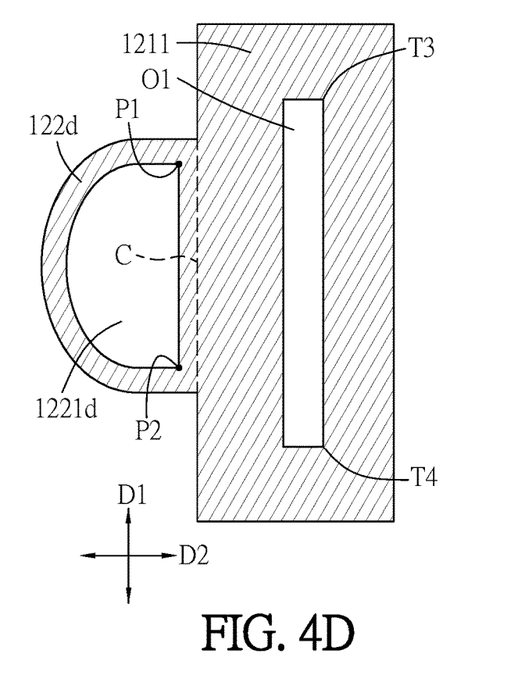

As shown in FIG. 4D, the shapes of the positioning portion 122d and the accommodating hole 1221d are, for example, both arc shapes.

To be noted, the above-mentioned shapes of the positioning portions and the accommodating holes are for illustrations. In different aspects, the designer can design the position portion and accommodating hole with different shapes based on the requirement. In some embodiments, the shape of the positioning portion and the shape of the accommodating hole can be the same or different, and the shape of the positioning portion and the shape of the accommodating hole can be designed based on the requirement. This disclosure is not limited thereto.

To be noted, in the aspect of FIG. 4C, the accommodating hole 1221c of the positioning portion 122c further has two end points (an end point P1' and an end point P2'). For example, the end point P1' and an end point P2' can be defined as two farthest end points of the accommodating hole 122 in the first direction D1. In this embodiment, a distance between the end point P1 and the end point P2 in the first direction D1 is less than a distance between the end point P1' and the end point P2' in the first direction D1. The end point P1 is located adjacent to the end point P1', the end point P2 is located adjacent to the end point P2', the end point T3 is located adjacent to the end point P1, and the end point T4 is located adjacent to the end point P2. In some embodiments, a distance d3 is defined between the end point P1' and the end point T3 in the first direction D1. The distance d3 can be, for example, greater than or equal to 5 mm. In some embodiments, a distance d3' is defined between the end point P2' and the end point T4 in the first direction D1. The distance d3' can be, for example, greater than or equal to 5 mm. In some embodiments, the distance d3 is different from the distance d3'. In some embodiments, the distance d3 or the distance d3' can be greater than or equal to 10 mm. The distance d3 or the distance d3' can be designed to be greater than or equal to 5 mm to block the penetrating path of the liquid or dusts entering the optical element 12, or to decrease the amount of the liquid or dusts penetrating into the second part 1212 of the optical element 12.

Figure 5A:
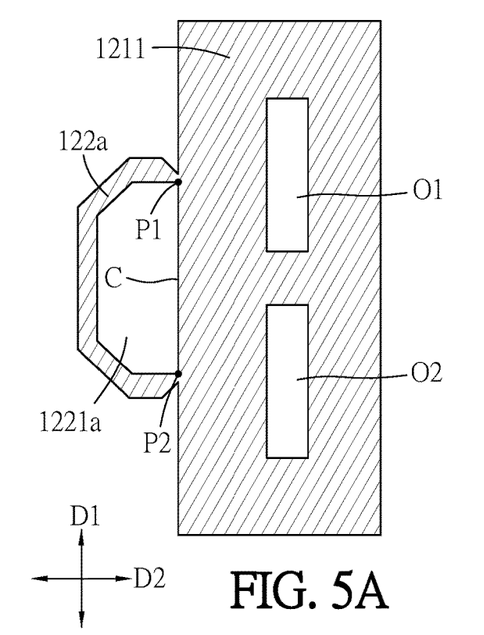
Figure 5B:
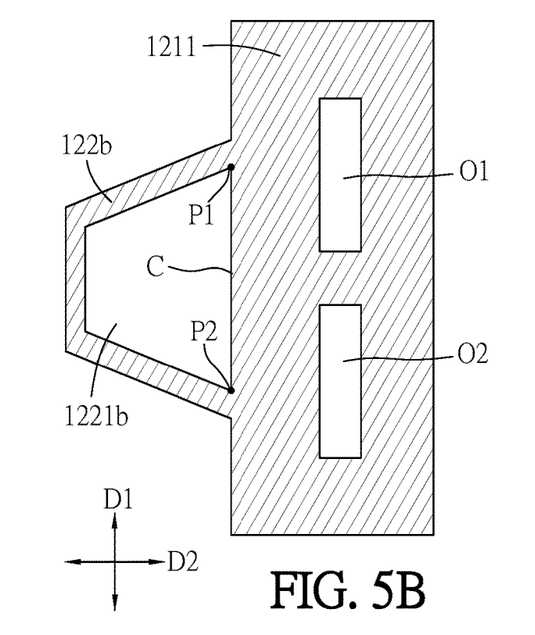
Figure 5C:
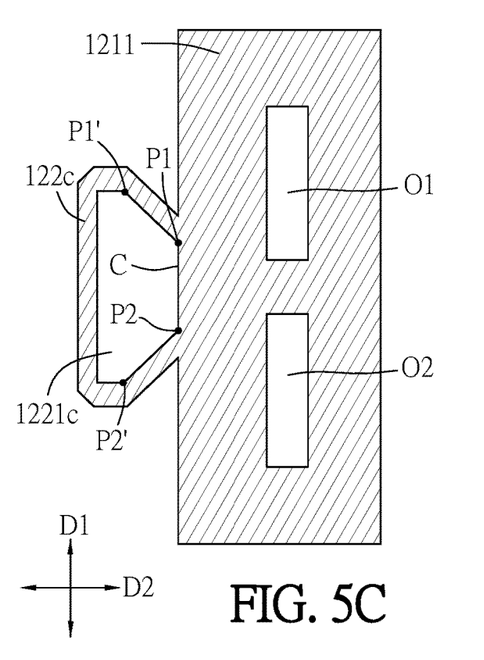
Figure 5D:
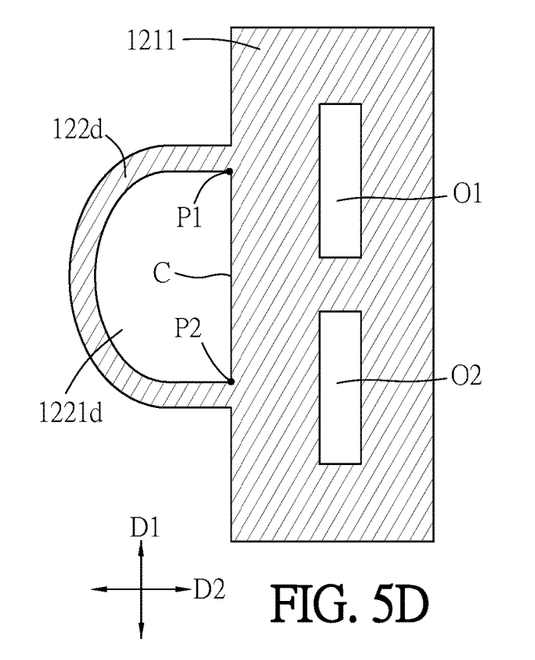

The shapes of the positioning portions and accommodating holes shown in FIGS. 5A to 5D are similar to the shapes of the positioning portions and accommodating holes shown in FIGS. 4A to 4D. Different from the embodiments shown in FIGS. 4A to 4D, the edge (e.g. the extension line of the end point P1 and the end point P2) of the accommodating hole in the aspects of FIGS. 5A to 5D is partially overlapped with the connection edge C in the top-view direction of the optical element 12. The edge (e.g. the extension line of the end point P1 and the end point P2) of the accommodating hole in the aspects of FIGS. 4A to 4D is not overlapped with the connection edge C in the top-view direction of the optical element 12. In addition, different from the embodiments shown in FIGS. 4A to 4D, the first part 1211 of the optical element 12 as shown in FIGS. 5A to 5D has a plurality of first openings (including a first opening O1 and a second opening O2). The first opening O1 and the second opening O2 can be disposed adjacent to each other along the first direction D1. The first opening O1 and the second opening O2 can be disposed adjacent to the positioning portion 122 (e.g. the positioning portion 1221a to the positioning portion 1221d), but this disclosure is not limited thereto. In addition, as shown in FIGS. 5A 5D, the first opening O1 and the second opening O2 can be disposed adjacent to the connection of the positioning portion 122 (e.g. the positioning portion 1221a to the positioning portion 1221d), but this disclosure is not limited thereto. In some embodiments, the shapes or sizes (length or width) of the first opening O1 and the second opening O2 can be the same or different, but this disclosure is not limited. In some embodiments, the extension direction of the first opening O1 and the extension direction of the second opening O2 can be the same or different.

FIGS. 6A to 6G are top views of the optical elements according to different embodiments of this disclosure.

Figure 6A:
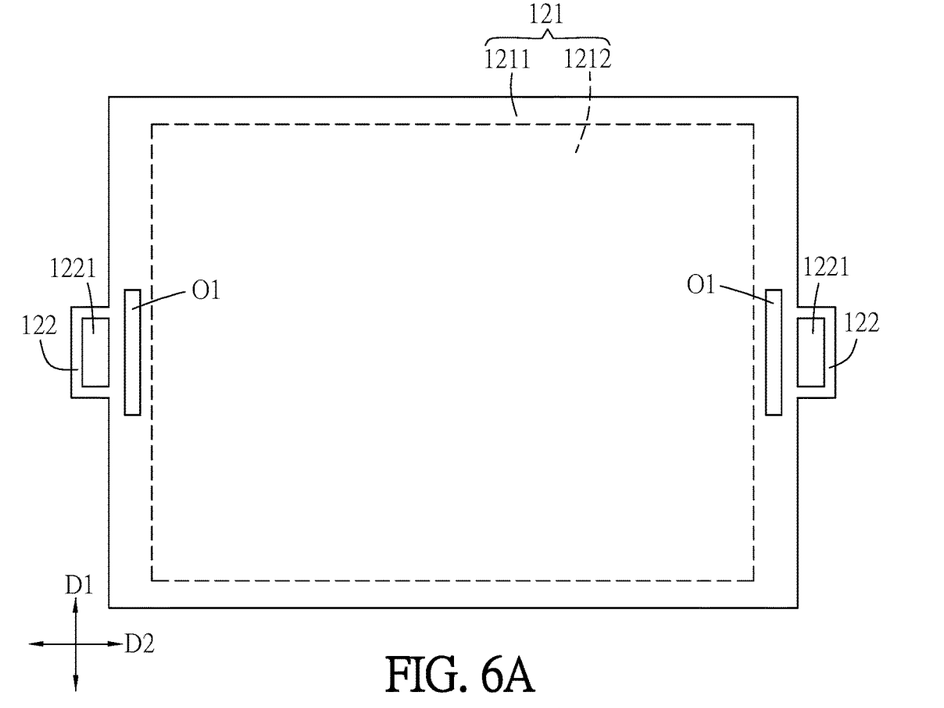
FIGS. 6A to 6G are top views of the optical elements according to different embodiments of this disclosure.

As shown in FIG. 6A, the left side and the right side of the optical element 12 can be symmetric structures. Specifically, each of the left side of the optical element 12 and the right side of the optical element 12 has a positioning portion 122 and an accommodating hole 1221, and the first openings O1 of the left side and right side of the optical element 12 are disposed adjacent to the corresponding positioning portions 122, respectively. The positioning portion 122 can be, for example, overlapped with the first opening O1 in the second direction D2.

Figure 6B:
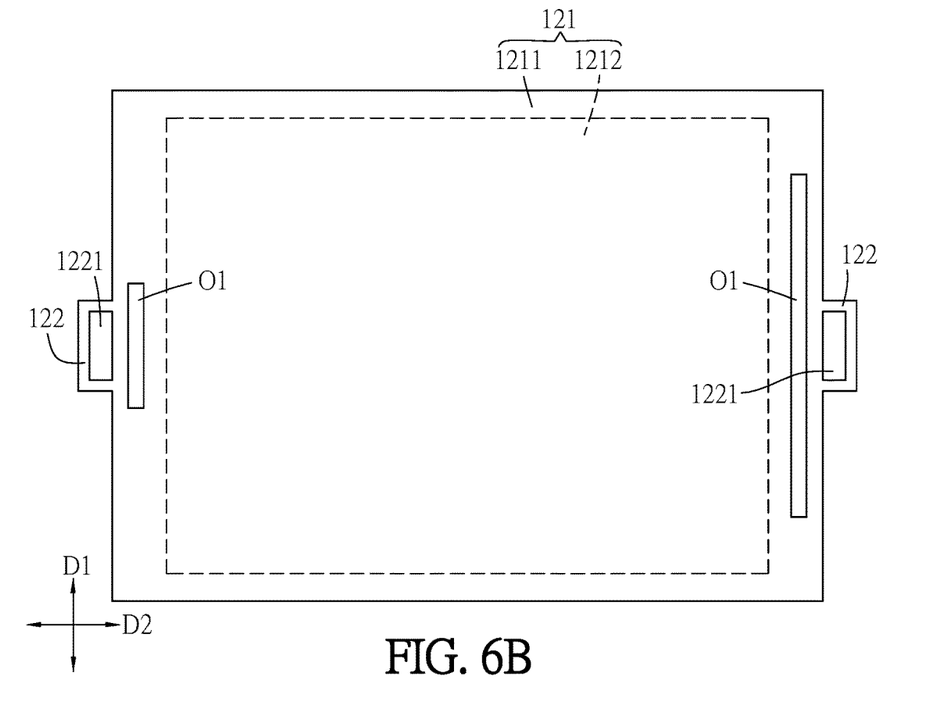

As shown in FIG. 6B, the length of the first opening O1 at the right side of the optical element 12 in the first direction D1 can be greater than the length of the first opening O1 at the left side of the optical element 12 in the first direction D1.

Figure 6C:
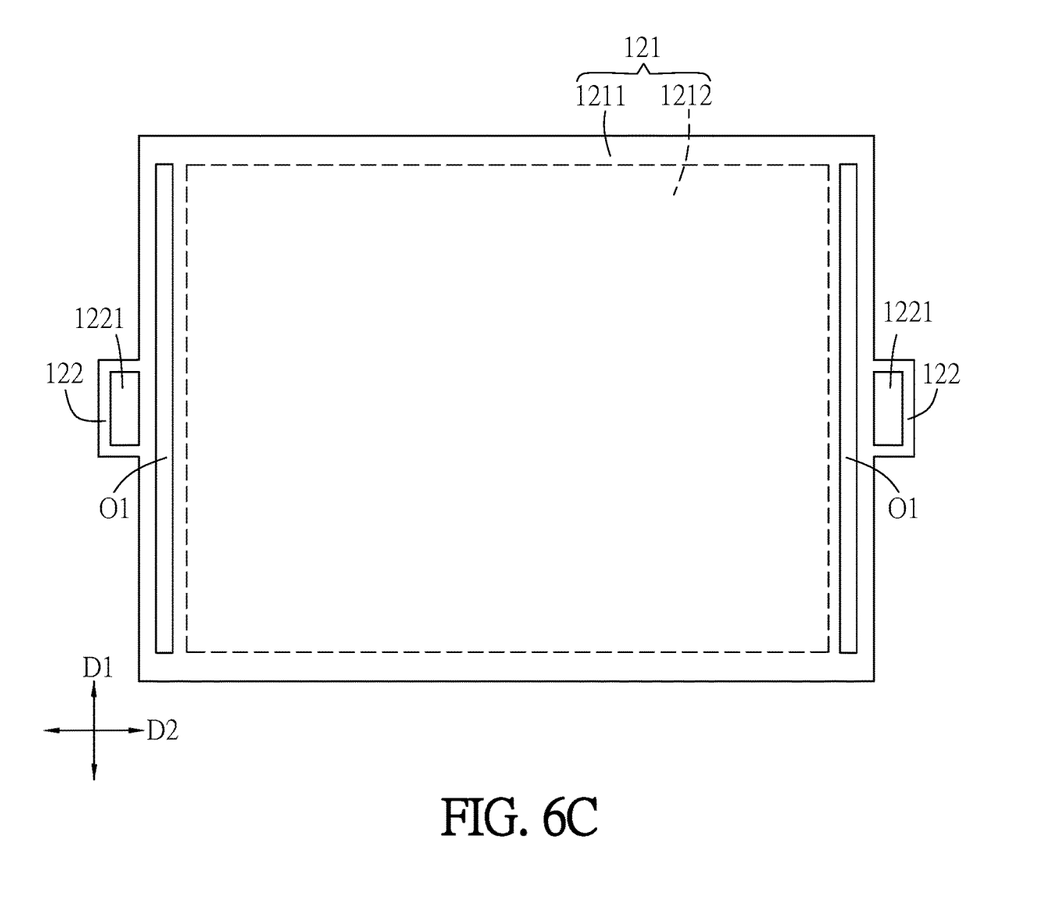

As shown in FIG. 6C, the left side and the right side of the optical element 12 can be symmetric structures. Specifically, each of the left side of the optical element 12 and the right side of the optical element 12 has a first opening O1. The lengths of the first openings O1 in the first direction D1 are, for example, roughly equal to the length of the second part 1212 in the first direction D1. In some embodiments, the lengths of the first openings O1 in the first direction D1 are, for example, greater than the length of the second part 1212 in the first direction D1, and the lengths of the first openings O1 in the first direction D1 are less than the length of the first part 1211 in the first direction D1. The second part 1212 can be defined as the display area of the main body portion 121, and it can be defined by the light-shielding material (not shown) or the frame sealant (not shown), but this disclosure is not limited. In some embodiments, the first opening O1 can be, for example, composed of openings with different extension directions. For example, the first opening O1 can be an L-shaped or U-shaped opening (not shown), but this disclosure is not limited thereto. For example, the first opening O1 can be disposed on at least one side of the first part 1211 of the optical element 12.

Figure 6D:
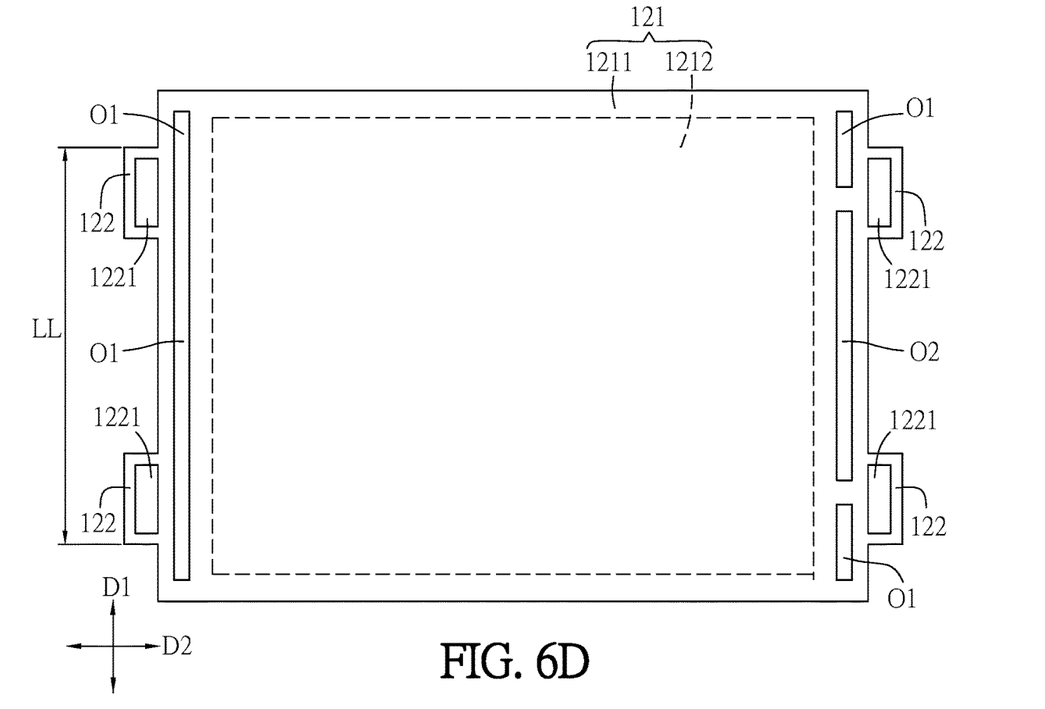

As shown in FIG. 6D, each of the left side and the right side of the optical element 12 is configured with two positioning portions 122, and two positioning portions 122 of one side of the optical element 12 are located at different corners of the optical element 12 (e.g. the round parts of the side of the optical element 12), but this disclosure is not limited thereto. Referring to FIG. 6D, the length of the first opening O1 at the left side of the optical element 12 in the first direction D1 can be, for example, greater than or equal to the distance LL between two farthest end points of the two corresponding positioning portions 122 in the first direction D1. As shown in FIG. 6D, the right side of the optical element 12 can be configured with three first openings (including a first opening O1, a first opening O2 and a first opening O3). For example, the first opening O1, the first opening O2 and the first opening O3 can be disposed adjacent to each other along the first direction D1, and the lengths of the first opening O1, the first opening O2 and the first opening O3 can be the same or different. The extension directions of the three first openings (the first opening O1, the first opening O2 and the first opening O3) can be the same, or the three first openings (the first opening O1, the first opening O2 and the first opening O3) can be arranged in parallel along the first direction D1. This disclosure is not limited thereto.

Figure 6E:
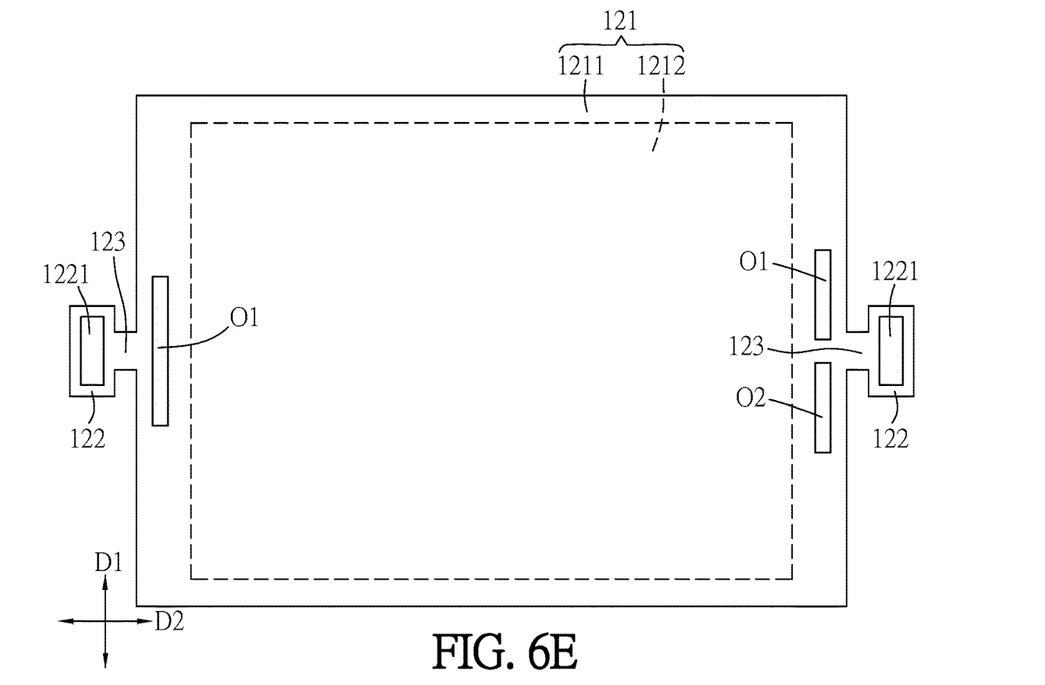

As shown in FIG. 6E, each of the left side and the right side of the optical element 12 can have a neck portion 123. The neck portions 123 disposed at two sides of the optical element 12 can be connected to the parts between the corresponding positioning portions 122 and the corresponding main body portions 121, respectively. The length of the neck portion 123 in the first direction D1 can be, for example, less than the length of the positioning portion 122 in the first direction D1, and the neck portion 123 is not configured with the opening. Referring to FIG. 6E, the left side of the optical element 12 has a first opening O1. The length of the first opening O1 can be, for example, greater than the length of the positioning portion 122 or the accommodating hole 1221 in the first direction D1. As shown in FIG. 6E, the right side of the optical element 12 has two first openings (a first opening O1 and a first opening O2). The first opening O1 and the first opening O2 are disposed adjacent two end points of the corresponding positioning portion 122 (or accommodating hole 1221), respectively. In this embodiment, the first opening O1 and the first opening O2 are partially overlapped with the neck portion 123 in the second direction D2.

Figure 6F:
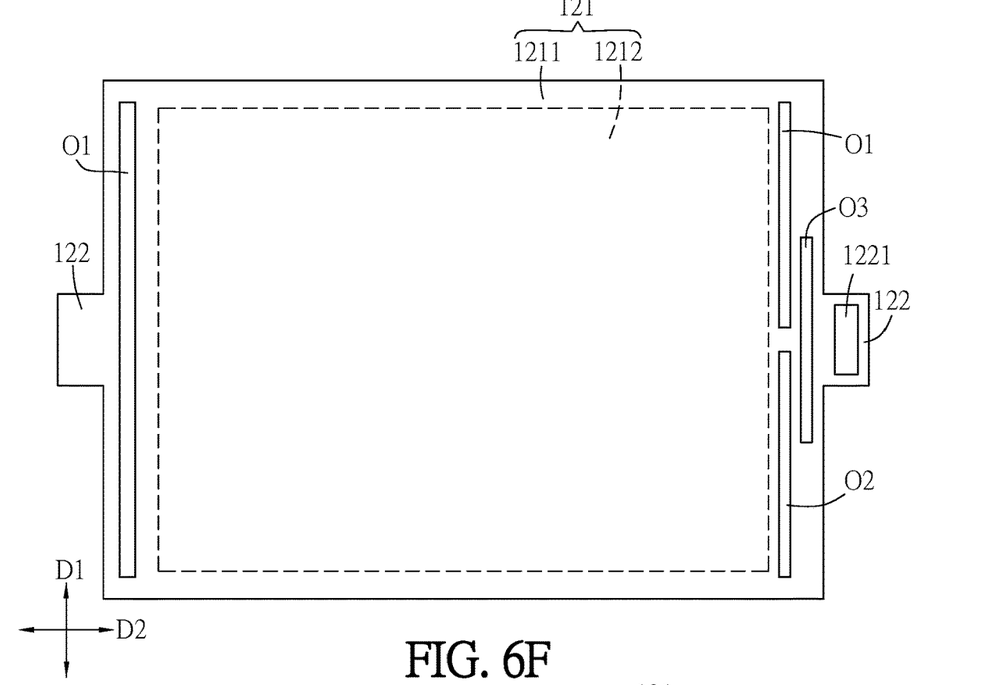

As shown in FIG. 6F, the positioning portion 122 at the left side of the optical element 12 is not configured with the accommodating hole, but the positioning portion 122 at the right side of the optical element 12 is configured with the accommodating hole 1221. The length of the first opening O1 at the left side in the first direction D1 is, for example, greater than or equal to the length of the second part 1212 in the first direction D1, but the length of the first opening O1 in the first direction D1 is less than the length of the first part 1211 in the first direction D1. As shown in FIG. 6F, the right side of the optical element 12 can be configured with three first openings (including a first opening O1, a first opening O2 and a first opening O3). For example, the first opening O1 can be partially overlapped with the first opening O2 and the first opening O3 in the second direction D2. That is, the first opening O1 is alternately disposed with the first opening O2 and the first opening O3. The first opening O3 is located between the first opening O1 and the positioning portion 122, and the first opening O3 is also located between the first opening O2 and the positioning portion 122. Accordingly, the first opening O3 can be partially overlapped with the first opening O1 (or the first opening O2) in the second direction D2. This configuration can block the penetrating path of the liquid or dusts.

Figure 6G:
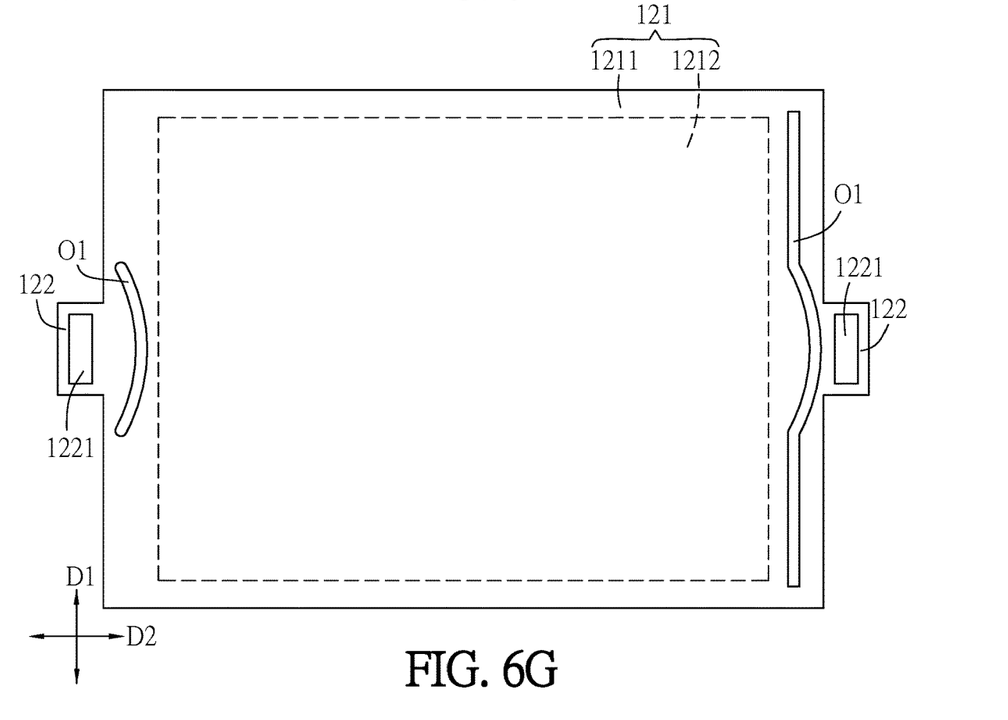

As shown in FIG. 6G, the first openings O1 at the right side and the left side of the optical element 12 have a partial arc structure. For example, the first opening O1 corresponding to the left side can be an arc structure, and the depressed part of the arc structure is disposed corresponding to the positioning portion 122. The first opening O1 corresponding to the right side can be a structure composed of an arc and two linear lines, and the arc is located between two linear lines. The depressed part of the arc structure of the first opening O1 at the right side is disposed corresponding to the second part 1212. This disclosure is not limited thereto. Although the first openings O1 of FIG. 6G have at least a part of the arc structure, they substantially extend along the first direction D1. The first direction D1 of FIG. 6G can be the same as the first direction D1 of FIG. 6F.

The shapes, lengths or widths of the above-mentioned first openings of the positioning portion and the first part is merely examples, but the disclosure is not limited thereto. In some embodiments, the shape of the first openings can include, for example, a wave shape, a zigzag shape, or other suitable irregular shape, but the disclosure is not limited thereto. In some embodiments, the shape of the accommodating hole in the normal direction of the main body portion of the optical element can be the same as or different from the shape of the positioning portion in the normal direction of the main body portion of the optical element. In some embodiments, the positioning portion, the accommodating hole or the opening can be located, for example, on other sides of the optical element (e.g. the sides other than the right and left sides). The present disclosure described an example in which the second part is located at the center and is rectangular, but the disclosure is not limited thereto. In some embodiments, the second part can be, for example, a polygon, a circle, an arc, or any of other suitable shapes, but the disclosure is not limited thereto. In some embodiments, the edge of the first part can be, for example, along the contour of the second part, so the first opening can be, for example, located on the first part and disposed along the outer edge of the second part. The disclosure is not limited thereto.

As mentioned above, in the display device of this disclosure, the first part of the main body portion of the optical element is disposed corresponding to the non-display area, and the first opening of the first part is located adjacent to the positioning portion (or the accommodating hole) of the optical element. When the liquid or dusts penetrates into the main body portion of the optical element through the positioning portion or side of the optical element, the configuration of the first opening disposed adjacent to the positioning portion (or the accommodating hole) can block the penetrating path of the liquid or dusts, thereby decreasing the mura phenomenon or increasing the optical quality of the display device.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A display device, comprising:
 a display panel comprising a non-display area and a display area;
 an optical element disposed corresponding to the display panel and comprising a main body portion and a positioning portion connected to the main body portion, wherein the main body portion comprises a first part corresponding to the non-display area and a second part corresponding to the display area, and the positioning portion comprises an accommodating hole; and
 a back plate, wherein the optical element is disposed on the back plate, and the back plate comprises a protruding portion disposed in the accommodating hole,
 wherein, the first part has a first opening disposed adjacent to the positioning portion,
 wherein an extension direction of the first opening is defined as a first direction, and a length of the first opening in the first direction is greater than a length of the positioning portion or the accommodating hole in the first direction.

2. The display device according to claim 1, wherein one side of the optical element is configured with at least one of the positioning portion.

3. The display device according to claim 1, wherein two opposite sides of the optical element are individually configured with at least one of the positioning portion.

4. The display device according to claim 1, wherein a second direction is perpendicular to the first direction, the optical element has a protruding structure extending along the second direction, and adjacent two of the protruding structures form a groove.

5. The display device according to claim 1, wherein a second direction is perpendicular to the first direction, and a width of the first opening in the second direction is less than a width of the positioning portion or a width of the accommodating hole in the second direction.

6. The display device according to claim 1, wherein a connection edge is disposed between the positioning portion and the first part, and a distance between the connection edge and the first opening ranges from 0.5 mm to 10 mm.

7. The display device according to claim 6, wherein a length of the first opening in the first direction is greater than a length of the connecting edge in the first direction.

8. The display device according to claim 1, wherein a second direction is perpendicular to the first direction, a connection edge is disposed between the positioning portion and the first part, and the connection edge and the first opening are overlapped in the second direction.

9. The display device according to claim 1, wherein a connection edge is disposed between the positioning portion and the first part, and an edge of the accommodating hole partially overlaps with the connection edge in a top-view direction of the optical element.

10. The display device according to claim 1, wherein a second direction is perpendicular to the first direction, a side of the accommodating hole disposed closest to the main body portion has a first end point and a second end point, the first opening has a third end point and a fourth end point in the first direction, the third end point is disposed adjacent to the first end point, the fourth end point is disposed adjacent to the second end point, and a distance between the first end point and the third end point in the first direction is greater than or equal to 5 mm.

11. The display device according to claim 1, wherein a second direction is perpendicular to the first direction, a side of the accommodating hole disposed closest to the main body portion has a first end point and a second end point, the accommodating hole has a third end point and a fourth end point, the third end point and the fourth end point are two farthest points of the accommodating hole in the first direction, the first end point is disposed adjacent to the third end point, the second end point is disposed adjacent to the fourth end point, and a distance between the first end point and the second end point in the first direction is less than a distance between the third end point and the fourth end point in the first direction.

12. The display device according to claim 1, wherein a shape of the first opening in a normal direction of the main body portion of the optical element comprises a polygonal shape, an arc shape, a wavy shape, or their combinations.

13. The display device according to claim 1, wherein the first part has a plurality of first openings disposed adjacent to the positioning portion.

14. The display device according to claim 1,
wherein the back plate has a slot, and the positioning portion is disposed corresponding to the slot.

15. The display device according to claim 14, wherein a length of the positioning portion in the first direction is less than a length of the slot in the first direction.

16. The display device according to claim 14, wherein the back plate further has a first protruding portion and a second protruding portion, the first protruding portion and the second protruding portion form the slot, the first protruding portion has a first end point, the second protruding portion has a second end point, the first opening has a third end point and a fourth end point in the first direction, the third end point is disposed adjacent to the first end point, the fourth end point is disposed adjacent to the second end point, a distance between the first end point and the third end point in the first direction is greater than or equal to $((L/2)+5)$ mm, and L indicates a length of the positioning portion in the first direction.

17. The display device according to claim 16, wherein a second direction is perpendicular to the first direction, and a minimum distance between a side of the first part and the first protruding portion or the second protruding portion ranges from 1 mm to 5 mm.

* * * * *